Sept. 25, 1956 S. H. ATKINSON 2,764,457
PISTONS
Filed Sept. 29, 1953
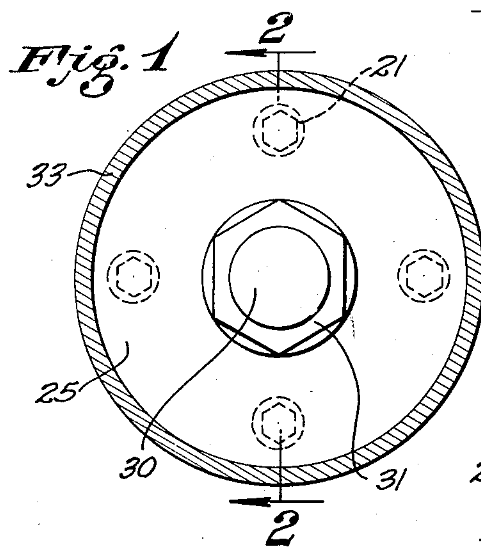
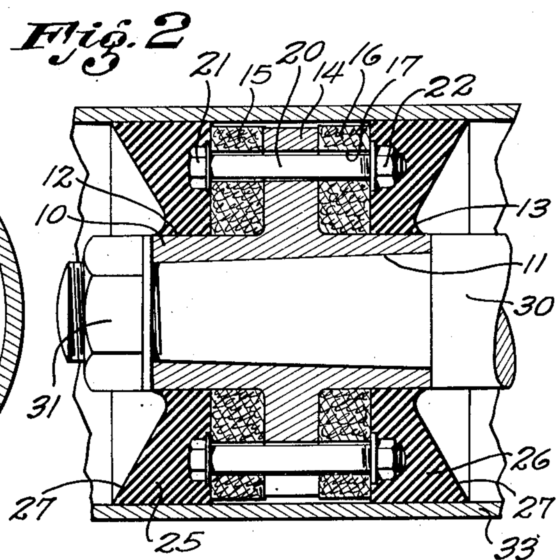
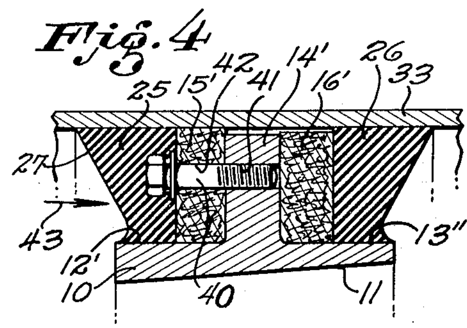
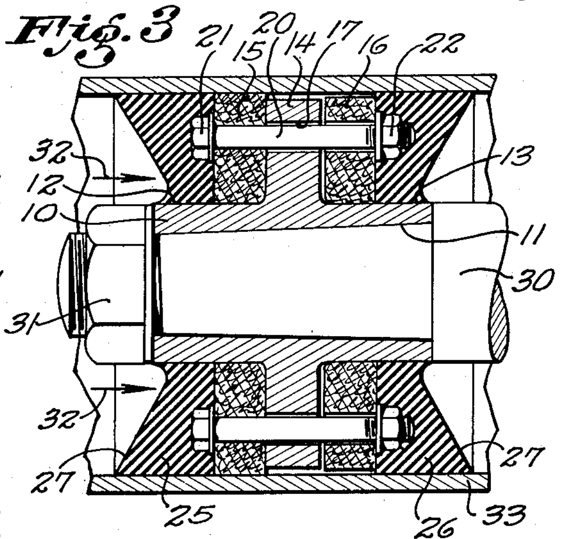
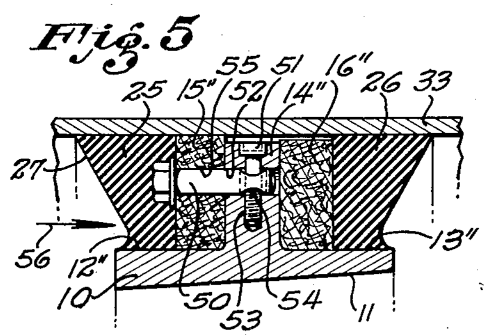
INVENTOR.
STANLEY H. ATKINSON
BY
Robert M. Mc Manigal
ATTORNEY.

United States Patent Office 2,764,457 Patented Sept. 25, 1956

2,764,457

PISTONS

Stanley H. Atkinson, Compton, Calif.

Application September 29, 1953, Serial No. 382,997

4 Claims. (Cl. 309—4)

This invention relates to pistons, and more particularly to pistons for use in mud pumps and adapted to be operated at high pressures, and to processes for making such pistons.

One of the objects of my invention is to provide a one-piece piston which is capable of long use at high operating pressures.

Another object of my invention is to provide a piston in which no portion of the piston is extruded between any other portion of the piston and the liner of the pump.

Another object of my invention is to provide a piston comprising a hub having a radial abutment, a fabric or reenforcing member and a resilient packing member in which means are provided to allow for limited movement of the fabric or other reenforcing member radially and laterally with respect to the radial abutment.

Another object of my invention is to provide a piston comprising a hub having a radial abutment, fabric or reenforcing members, means for allowing limited movement of the reenforcing members with respect to the radial abutment, and resilient packing members molded or otherwise fixed to the reenforcing members but not molded or fixed to any part of the metallic piston body in order to allow for limited movement of the resilient packing members both radially and laterally.

Another object of my invention is to provide a piston comprising a hub having a radial abutment, fabric or reenforcing members, means for allowing limited movement of the reenforcing members with respect to the radial abutment, and resilient packing members secured to only the fabric or reenforcing members and thereby allowing for limited movement of the packing members both radially and laterally.

Another object of my invention is to provide a process of making one-piece pistons in which rubber packing members are molded to the fabric or other reenforcing member after the reenforcing members are secured to the radial abutment.

Another object of my invention is to provide a process of making one-piece pistons which comprises securing annular reenforcing members to a piston body provided with an annular radial abutment and then molding resilient packing members to the reenforcing members but not to any part of the piston body.

My invention has many other objects, advantages, and features, some of which, with the foregoing, will be set forth at length in the following description where I shall outline certain forms of my invention, which I have selected for illustration in the drawings accompanying and forming a part of the present specification.

In the drawings:

Fig. 1 is an end view of a piston embodying my invention;

Fig. 2 is a section taken on the line 2—2 of Fig. 1;

Fig. 3 is a view similar to Fig. 2 showing the piston in use with pressure in the direction indicated by the arrow;

Fig. 4 is a fragmentary view similar to a portion of Fig. 3 showing a modification of my invention; and Fig. 5 is a fragmentary view similar to a portion of Fig. 3 showing another modification of my invention.

Referring to the drawings, the numeral 10 designates a piston body having a tapered bore 11, cylindrical portions 12 and 13, and an annular radial abutment or flange 14.

Annular members 15 and 16 are adapted to be mounted on the cylindrical portions 12 and 13, respectively, of the piston body 10 adjacent to the radial abutment 14, which abutment is adapted to form a backing plate for said members. The members 15 and 16 may be made of fabric or other suitable reenforcing material.

Means are provided in order to allow for limited movement of the fabric member with respect to the radial abutment 14.

In the instance of this arrangement shown in Figs. 1, 2, and 3, the radial abutment 14 and the annular members 15 and 16 are provided with a plurality of openings 17. Bolts 20 having bolt heads 21 are adapted to be inserted in said openings 17 and the desired compression may be placed on the annular members 15 and 16 by tightening the bolt nuts 22. The openings 17 through the abutment 14, as shown in the drawings, are of slightly greater diameter than the bolts 22 in order to provide for the desired limited movement.

Uncured resilient packing members 25 and 26 are then mounted on the cylindrical portions 12 and 13, respectively, of the piston body 10, outwardly of the annular members 15 and 16 respectively. The packing elements 25 and 26 may be made of neoprene or rubber and may be provided with sealing means 27 at their outer radial peripheral portions. The packing elements 25 and 26 are then vulcanized or molded to the annular members 15 and 16 only, and thereby provide a piston made in a single unit.

The piston is adapted to be mounted on the piston rod 30 after which a nut 31 is threaded onto the threaded portion of the piston rod 30 in order to securely hold the piston in position.

During the pressure stroke in the direction indicated by the arrows 32, the annular member 15 is forced to move radially outward and slightly to the right into the position shown on the left hand side in Fig. 3, and fills the area between said member and the adjacent portion of the liner 33 of the pump so that no part of the packing element can be forced into this area. The amount of movement (both radially and laterally) of the annular members 15 and 16 is limited by the bolts 20. The movement of the packing elements 25 and 26 is limited by the annular members 15 and 16 to which they are secured and the fact that they are positioned between the piston body (but not secured thereto) and the liner 33.

The modification of my invention shown in Fig. 4 is similar to the form of my invention shown in Figs. 1, 2 and 3, except that instead of using bolts to allow for limited movement of the annular members 15' and 16' with respect to the abutment 14', studs 40 are used for that purpose. The abutment 14' is provided with a plurality of staggered threaded bores 41 and the openings 42 in the annular members 15' and 16' are staggered with respect to each other. After the annular members 15' and 16' are mounted on the cylindrical portions 12' and 13', respectively, of the piston body, the studs 40 are placed through the openings 42 and threaded into the threaded bores 41.

During the pressure stroke indicated by the arrow 43, the annular member 15' is forced radially outward and slightly to the right into the position shown on the left hand side in Fig. 4. The amount of movement of the annular members 15' and 16' is limited by the studs 40, which allow for limited movement of said annular members.

The modification of my invention shown in Fig. 5 is similar to the form of my invention shown in Figs. 1, 2 and 3, except that instead of using bolts to allow for limited movement of the annular members 15″ and 16″ with respect to the abutment 14″, pins 50 and 51 are used for that purpose. The abutment 14″ is provided with a plurality of staggered lateral bores 52 and a plurality of radial countersunk threaded bores 53 which intersect peripheral portions of the lateral bores 52. Each of the pins 50 is provided with a hole 54 which hole is wider than the diameter of the pins 51. The openings 55 in the annular members 15″ and 16″ are staggered with respect to each other. After the annular members 15″ and 16″ are mounted on the cylindrical portions 12″ and 13″, respectively, of the piston body, the pins 50 are placed through the openings 55 and into the bores 52, after which the pins 51 are positioned through the holes 54 and threaded into the threaded bores 53. This arrangement is such that the pins 50 can move to a slight extent back and forth in the lateral bores 52 in the abutment 14″, but that said pins 50 cannot be pulled out because the pins 51 are positioned through the holes 54 of said pins 50.

During the pressure stroke indicated by the arrow 56, the annular member 15″ is forced radially outward and slightly to the right into the position shown on the left hand side in Fig. 5. The amount of movement of the annular members 15″ and 16″ is limited by the pins 50 and 51, which allow for limited movement of both said annular members.

From the description set forth in connection with the form of my invention shown in Figs. 1, 2 and 3, the remainder of the process of making, and the remainder of the construction and the operation of the forms of my invention shown in Figs. 4 and 5, will be readily understood by those skilled in the art to which the invention appertains and therefore will not be repeated herein.

While I have described three embodiments of my invention, and of the process of making pistons according to my invention, I desire to have it understood that the forms shown are merely illustrative and that the invention is not to be limited to the details disclosed herein, but is to be accorded the full scope of the appended claims.

I claim:

1. In a pump piston: a hub having a radial abutment intermediate the ends thereof: a non-metallic annular member mounted on said hub with said abutment forming a backing member for said annular member; said radial abutment and said annular member being provided with openings extending through said members; fastening means extending through said openings in said radial abutment and said annular member for allowing movement of said annular member with respect to said abutment; and a resilient packing member mounted on said hub outwardly of said annular member.

2. In a pump piston: a hub having a radial abutment intermediate the ends thereof: a non-metallic annular member mounted on said hub with said abutment forming a backing member for said annular member; said radial abutment and said annular member being provided with openings extending through said members; bolt means extending through said openings in said radial abutment and said annular member for allowing movement of said annular member with respect to said abutment; and a resilient packing member molded on said hub outwardly of said annular member after said bolt means are mounted in said openings.

3. In a pump piston: a hub having a radial abutment intermediate the ends thereof; non-metallic annular members mounted on said hub on opposite sides of said abutment with said abutment forming a backing element for said annular members; said radial abutment and said annular members being provided with openings extending through said members, fastening means extending through said openings in said radial abutment and said annular member for allowing movement of said annular members with respect to said abutment; and resilient packing elements mounted on said hub.

4. In a pump piston: a hub having a radial abutment intermediate the ends thereof; non-metallic annular members mounted on said hub on opposite sides of said abutment with said abutment forming a backing element for said annular members; said radial abutment and said annular members being provided with openings extending through said members, bolt means extending through said openings in said radial abutment and said annular member for allowing movement of said annular members with respect to said abutment; and resilient packing elements molded on said hub after said bolt means are mounted in said openings.

References Cited in the file of this patent

UNITED STATES PATENTS

| | | |
|---|---|---|
| 2,211,454 | Failing et al. | Aug. 13, 1940 |
| 2,306,800 | Caldwell | Dec. 29, 1942 |
| 2,306,838 | Volpin | Dec. 29, 1942 |
| 2,443,110 | MacClatchie | June 8, 1948 |
| 2,484,474 | Stock | Oct. 11, 1949 |
| 2,576,025 | MacClatchie | Nov. 20, 1951 |
| 2,587,091 | Barnes et al. | Feb. 26, 1952 |
| 2,599,082 | Wells | June 3, 1952 |
| 2,677,581 | Taylor | May 4, 1954 |
| 2,679,441 | Stillwagon | May 25, 1954 |